UNITED STATES PATENT OFFICE.

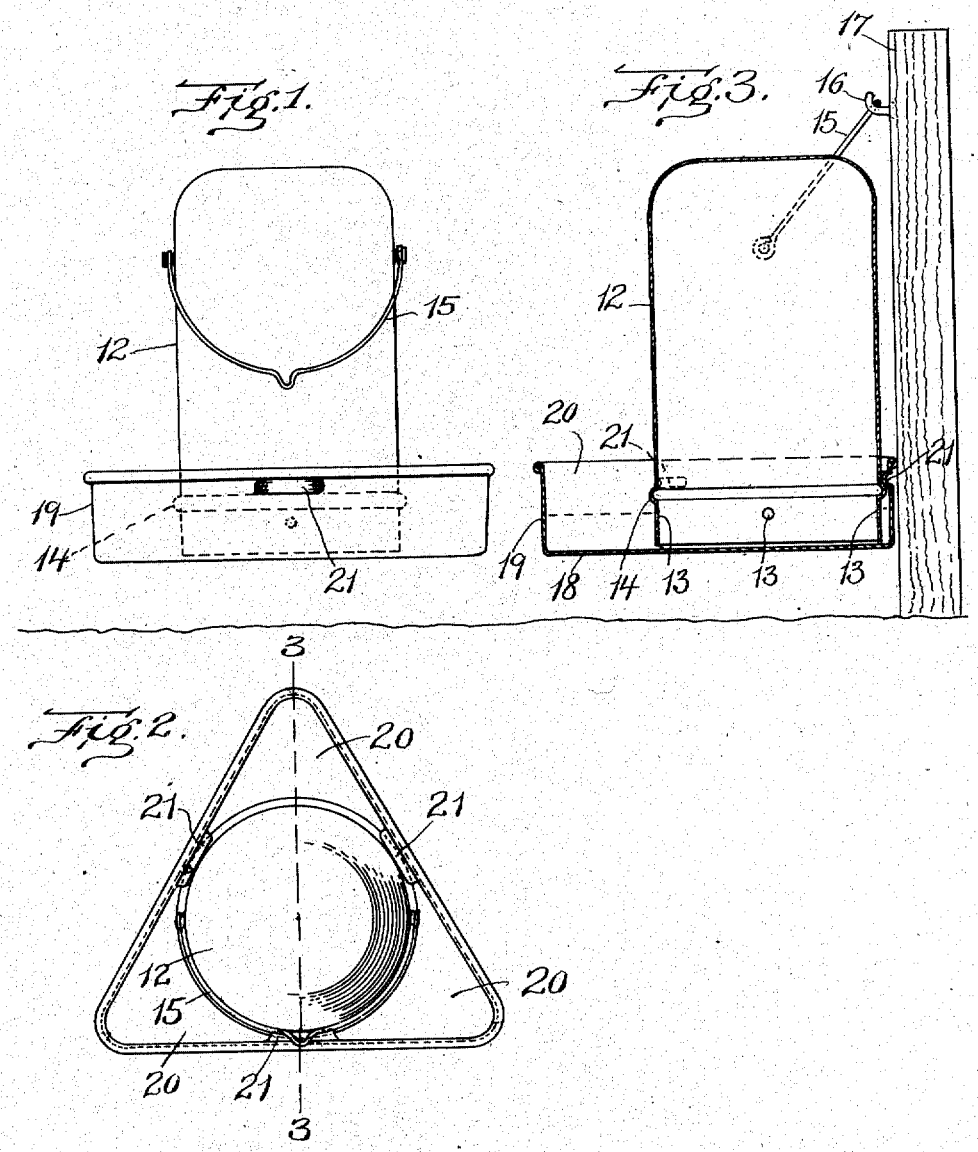

FRANK F. B. CHAPMAN, OF WINCHESTER, MASSACHUSETTS.

DRINKING-FOUNTAIN FOR POULTRY.

983,978.   Specification of Letters Patent.   Patented Feb. 14, 1911.

Application filed September 10, 1910. Serial No. 581,363.

*To all whom it may concern:*

Be it known that I, FRANK F. B. CHAPMAN, of Winchester, in the county of Middlesex and State of Massachusetts, have invented certain new and useful Improvements in Drinking-Fountains for Poultry, of which the following is a specification.

This invention relates to a poultry drinking fountain which comprises a reservoir closed at its top and open at its bottom, and a pan, the curb of which surrounds the bottom of the reservoir, the arrangement being such that water is permitted to escape to a limited extent from the reservoir into the pan, and is retained in the reservoir by atmospheric pressure when a predetermined quantity has entered the pan.

The invention has for its object to provide a fountain of this character of such construction that the reservoir and pan may be readily connected and separated, and when connected will provide a plurality of independent drinking cups which are spaced apart so that they are separably accessible to different birds, the reservoir being of cylindrical form and adapted to be economically manufactured.

The invention consists in the improvements which I will now proceed to describe and claim.

Of the accompanying drawings which form a part of this specification,—Figure 1 represents a side elevation of a drinking fountain embodying my invention; Fig. 2 represents a top plan view of the same; and Fig. 3 represents a section on line 3—3 of Fig. 2, showing a fountain suspended and one side of the pan seated on a vertical support.

In the drawings, 12 represents a sheet metal reservoir which is of cylindrical form throughout the greater portion of its length, the upper end of the reservoir being somewhat contracted or tapered, as shown by Figs. 1 and 3. The upper end of the reservoir is closed and its lower end is open, the lower end portion of the reservoir being provided with one or more small outlets 13.

14 represents a peripheral boss which extends around the reservoir and is horizontal when the fountain is in use. The reservoir is provided with means, such as a hinged bail 15 whereby it may be suspended from an overhead support, such as a hook 16, the latter being engaged with a supporting wall or post 17, having a vertical face which forms a seat for a portion of the pan, as hereinafter described.

18 represents the bottom, and 19 the curb of the pan portion of my improved reservoir. The bottom 18, which is preferably flat, has an area greater than that of the cross section of the reservoir. The curb 19 is formed to surround the lower end portion of the reservoir and to bear on the periphery of the reservoir at a plurality of points uniformly spaced apart. The form of the curb is such that it presents a series of outwardly projecting bays which alternate with the portions of the curb which bear on the reservoir, and form a plurality of spaced drinking cups 20, which radiate from the center of the pan and reservoir, and are sufficiently separated from each other to permit each to be used by a different bird, so that it is impossible for a tyrannously-disposed bird to deprive other birds of the privilege of the fountain, provision being made for the accommodation of at least three birds at the same time.

The pan is preferably triangular in form, as shown by Fig. 2, the proportions of the pan being such that the central portions of the sides of the curb constitute bearings each of which has a limited contact with a portion of the periphery of the reservoir, the angles formed by the intersections of the sides constituting the outer walls of the independent drinking cups 20.

The portions of the curb which bear on the reservoir are formed as bosses 21 adapted to spring into engagement with the peripheral boss 14 on the reservoir when the latter is introduced in to the pan, the sides of the curb being sufficiently resilient to permit the engagement of the bosses 21 with the boss 14 when the pan is introduced, and a disengagement of the bosses 21 from the boss 14 when force is applied tending to separate the reservoir from the pan.

Either side of the triangular curb is adapted to be seated on the vertical support 17 when the fountain is suspended, as shown by Fig. 3, provision being thus made for supporting the fountain so that it will not tip or swing side-wise.

The triangular form of the pan results in the formation of drinking cups of limited area so that small birds or chickens cannot fall in to the same.

The outlet 13 in the lower portion of the reservoir is below the upper edge of the curb so that the quantity of water required to seal the said outlet does not rise to the top of the curb.

The limited bearing of the straight sides of the curb on the cylindrical surface of the reservoir, reduces to the minimum the difficulty of separating the parts when the water in them is frozen.

The cylindrical form of the reservoir and the continuity of the boss 14 thereof, enable the reservoir to be inserted without the necessity of care as to the direction in which any particular side of the reservoir faces.

The triangular pan may be formed by dies from a single sheet of metal without soldered or other joints, the central portions of the sides of the pan constituting guides and bearings which guide and center the reservoir, so that the one piece pan, formed as shown, without attachments or additions of any kind is adapted to securely engage a reservoir and hold it in such relation to the walls of the pan that a plurality of independent isolated cups are formed by the assemblage of the parts. The cylindrical reservoir may also be formed from a single piece of sheet metal by dies or by spinning, without joints.

It will be seen that the cylindrical reservoir may be engaged with the triangular pan by a rectilinear movement of the reservoir into the pan, without care on the part of the operator as to the position of any particular part of the external surface of the reservoir with relation to the pan. In other words, it is not necessary that the reservoir be adjusted to face in any given direction. It will be also seen that the isolated cups projecting radially from the reservoir, enable a fowl to drink without facing the reservoir, and therefore without rubbing the comb against the reservoir. When the comb is very prominent, it is liable to be injured and defaced by contact with the reservoir of a fountain when the fowl is obliged to face the reservoir in drinking.

I claim:

1. A drinking fountain comprising a cylindrical reservoir closed at its upper end and open at its lower end and having means whereby it may be suspended, and an angular pan composed of a bottom of greater area than the cross section of the reservoir, and a curb formed to surround and rotatably engage the lower end of the reservoir and having a plurality of spaced bearings adapted to simultaneously engage limited portions of the periphery of the reservoir, and a plurality of bays alternating with said bearings and projecting outwardly from the reservoir to form a series of independent substantially radial drinking cups, the reservoir and pan being provided with interlocking members whereby they may be detachably connected.

2. A drinking fountain comprising a cylindrical reservoir closed at its upper end and open at its lower end and having means whereby it may be suspended and provided with a circumferential horizontal boss at its lower end portion, and a triangular pan composed of a bottom of greater area than the cross section of the reservoir, and a curb formed to surround and rotatably engage the lower end of the reservoir, said curb having a plurality of spaced bearings adapted to simultaneously engage the limited portions of the periphery of the reservoir, bosses on said bearings adapted to simultaneously and yieldingly engage the peripheral boss on the reservoir, and a plurality of bays alternating with said bearings and forming a plurality of independent drinking cups radiating from the center of the pan and reservoir.

3. A drinking fountain comprising a cylindrical reservoir closed at its upper end and open at its lower end, and provided with means whereby it may be suspended, and a pan composed of a bottom of greater area than the cross section of the reservoir, and a curb of substantially triangular form adapted to surround the lower end portion of the reservoir and bear thereon at the central portions of its sides, the angles of the curb projecting from the reservoir and forming radial drinking cups, and either of the external surfaces of the sides of the curb being adapted to be seated on a vertical support from which the fountain is suspended, the reservoir and pan being provided with interlocking members whereby they may be detachably connected.

In testimony whereof I have affixed my signature, in presence of two witnesses.

FRANK F. B. CHAPMAN.

Witnesses:
C. F. BROWN,
P. W. PEZZETTI.